`US006122642A`

United States Patent [19]
Mehovic

[11] Patent Number: 6,122,642
[45] Date of Patent: *Sep. 19, 2000

[54] SYSTEM FOR PROPAGATING, RETRIEVING AND USING TRANSACTION PROCESSING FACILITY AIRLINE COMPUTERIZED RESERVATION SYSTEM DATA ON A RELATIONAL DATABASE PROCESSING PLATFORM

[75] Inventor: Farid Mehovic, Hurst, Tex.

[73] Assignee: Sabre Inc., Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/588,463

[22] Filed: Jan. 18, 1996

[51] Int. Cl.$^7$ .................................................. G06F 17/30
[52] U.S. Cl. ............................ 707/104; 705/5; 700/216; 395/705; 707/3; 707/4
[58] Field of Search ....................... 340/825.28; 395/206, 395/205, 610, 705; 705/5, 6; 707/1, 3, 4, 10, 200, 104; 709/206; 700/216

[56] References Cited

U.S. PATENT DOCUMENTS

| | | | |
|---|---|---|---|
| 4,677,569 | 6/1987 | Nakano et al. ....................... 364/513.5 |
| 4,714,995 | 12/1987 | Materna et al. ......................... 395/617 |
| 4,862,357 | 8/1989 | Ahlstrom et al. ........................... 705/6 |
| 4,875,155 | 10/1989 | Iskiyan et al. ........................... 364/200 |
| 5,113,499 | 5/1992 | Ankney et al. ..................... 340/825.34 |
| 5,187,787 | 2/1993 | Skeen et al. ............................. 395/680 |
| 5,201,046 | 4/1993 | Goldberg et al. ........................ 395/600 |
| 5,225,990 | 7/1993 | Bunce et al. ............................. 364/478 |
| 5,231,670 | 7/1993 | Goldhor et al. ........................... 381/43 |
| 5,253,166 | 10/1993 | Dettelbach et al. ..................... 364/407 |
| 5,255,184 | 10/1993 | Hornick et al. ......................... 364/407 |
| 5,257,366 | 10/1993 | Adair et al. ................................. 707/4 |
| 5,278,978 | 1/1994 | Demers et al. ........................... 395/612 |
| 5,311,425 | 5/1994 | Inada ....................................... 364/407 |
| 5,317,568 | 5/1994 | Bixby et al. .............................. 370/401 |
| 5,319,773 | 6/1994 | Britton et al. ..................... 395/182.13 |
| 5,347,632 | 9/1994 | Filepp et al. ....................... 395/200.09 |
| 5,381,534 | 1/1995 | Shi .......................................... 395/706 |
| 5,390,314 | 2/1995 | Swanson ................................. 395/705 |
| 5,416,917 | 5/1995 | Adair et al. ............................. 395/500 |
| 5,537,533 | 7/1996 | Staheli et al. ...................... 395/182.03 |
| 5,560,005 | 9/1996 | Hoover et al. .......................... 395/600 |
| 5,586,312 | 12/1996 | Johnson et al. ........................... 707/10 |
| 5,628,011 | 5/1997 | Ahamed et al. .......................... 707/10 |
| 5,692,174 | 11/1997 | Bireley et al. .............................. 707/3 |
| 5,758,149 | 5/1998 | Bierma et al. .............................. 707/8 |
| 5,794,229 | 8/1998 | French et al. .............................. 707/2 |
| 5,839,114 | 11/1998 | Lynch et al. ................................ 705/5 |
| 5,956,707 | 9/1999 | Chu ........................................... 707/3 |

OTHER PUBLICATIONS

Attaluri et al., "Concurrency Control of Large Unstructured Data," IEEE, pp. 314–323, 1998.

IBM Transaction Processing Facility—General Information Manual Version 3.1—First Edition (Jun. 1989).

*Primary Examiner*—Hosain T. Alam
*Assistant Examiner*—Charles L. Rones
*Attorney, Agent, or Firm*—Finnegan, Henderson, Farabow, Garrett & Dunner, L.L.P.

[57] ABSTRACT

A system and method for propagating airline computerized reservation system TPF data to a relational database platform comprising a computerized reservation system transaction processing source computer in communication with an output data file, an input data structure, a functional server computer and a relational database management system target computer. The relational database management system target computer is in communication with the functional server computer and an output database. A data propagation selection means is resident within the transaction source computer and is in communication with the functional server computer and target relational database management system target computer. A function management means is resident within the functional server computer and is in communication with the transaction source computer and the relational database management system computer.

14 Claims, 5 Drawing Sheets

SYSTEM FOR PROPAGATING, RETRIEVING AND USING TRANSACTION PROCESSING FACILITY AIRLINE COMPUTERIZED RESERVATION SYSTEM DATA ON A RELATIONAL DATABASE PROCESSING PLATFORM

This application claims benefit, under 35 U.S.C. § 120, of United States patent applications Ser. Nos. 08/560,295 and 08/560,466, both filed on Nov. 17, 1995.

TECHNICAL FIELD OF THE INVENTION

This invention relates in general, to electronic data manipulation, and in particular to, a system and method for propagating, retrieving and using airline computerized reservation system Transaction Processing Facility data propagated to a relational database platform thus enabling the execution of relational database functions using the propagated Transaction Processing Facility data.

BACKGROUND OF THE INVENTION

Transaction Processing Facility ("TPF") is a term recognized throughout the data processing industry, and refers to a highly specialized, real-time, transaction processing, operating system such as the American Airlines' SABRE computerized reservation system ("CRS").

The American Airlines' TPF based CRS is utilized to maximize hardware and software resources for the purpose of processing real time transactions efficiently. Unfortunately, current TPF based airline CRSs fail to respond adequately to critical data accessibility and application independence requirements of today's competitive business environment—requirements addressed by the instant invention.

The intrinsic value of any airline reservation system's TPF based data repository is that it represents an inventory of information that is maintained in as current a manner as possible. Such information is typically referred to as real-time information. Unlike information governed by a Relational Database Management System (RDBMS), currently TPF based CRS resident information may only be accessed and utilized by applications managed through the limited purpose TPF control program. Consequently, though a TPF based CRS maintains huge volumes of real-time data resources, it is woefully deficient in its ability to present these resources in a timely and effective manner for use by non-TPF based applications.

As an example, should non-TPF applications require data stored within an airline TPF based CRS environment, such data could be (1) copied into the non-TPF environment via a batch processing scenario, or (2) retrieved from the TPF based CRS via on-line communication channels. If the RDBMS application needs real-time data, option (1) becomes unfeasible due to processing delays and data accuracy impact, associated with host processor and storage device overhead. Option (2) becomes equally unacceptable due to communications delay—most particularly when the application requires reference to more than a single element of real-time data. Option (2) bears the further significant detriment of requiring extensive modification to applications within the airline TPF based CRS environment to facilitate presentation of such data.

The optimum solution to this long standing problem is a means by which real-time airline TPF based CRS data is propagated upon demand to a RDBMS for retrieval and use by the infinite variety of user friendly RDBMS in use throughout today's data processing industry.

The present invention provides the framework within which TPF based CRS data is propagated to a RDBMS for subsequent retrieval and use in a transparent manner by the end user.

SUMMARY OF THE INVENTION

The present invention provides a comprehensive system and methodology to automate the migration of data structures from an airline TPF based CRS processing environment and, in particular, the American Airlines' SABRE TPF based CRS environment to a relational database management system (RDBMS) for transparent retrieval and use by the end user. The invention thus provides a unique solution to a long standing data processing dilemma—how to propagate real-time airline TPF based CRS data quickly, directly, and transparently, from the airline TPF based CRS processing environment to any relational database management system (RDBMS) supported by Structured Query Language (SQL) command processing for use by the end user.

As an overview, the invention can be viewed as consisting of the following elements:

(1) hardware components sufficient to satisfy routine airline TPF based CRS and RDBMS requirements;

(2) data propagation code embedded within those airline TPF based CRS applications utilized to update or construct data to be processed within the source airline TPF based CRS processing environment;

(3) transmitting such data asynchronously via readily available communication protocols to a function management processor;

(4) a function management processor to identify, parse and convert such data to an appropriate relational representation;

(5) submission of such converted data to a target RDBMS; and (6) loading and updating the airline TPF based CRS propagated relational data; (7) direct RDBMS or TPF facilitated retrieval and use of the propagated airline CRS relational data by the end user.

BRIEF DESCRIPTION OF THE INVENTION

Other aspects of the invention and its advantages may be appreciated with reference to the following detailed description taken in conjunction with the appended drawings in which.

DETAILED DESCRIPTION OF THE INVENTION

Figures 1, 8, 9:
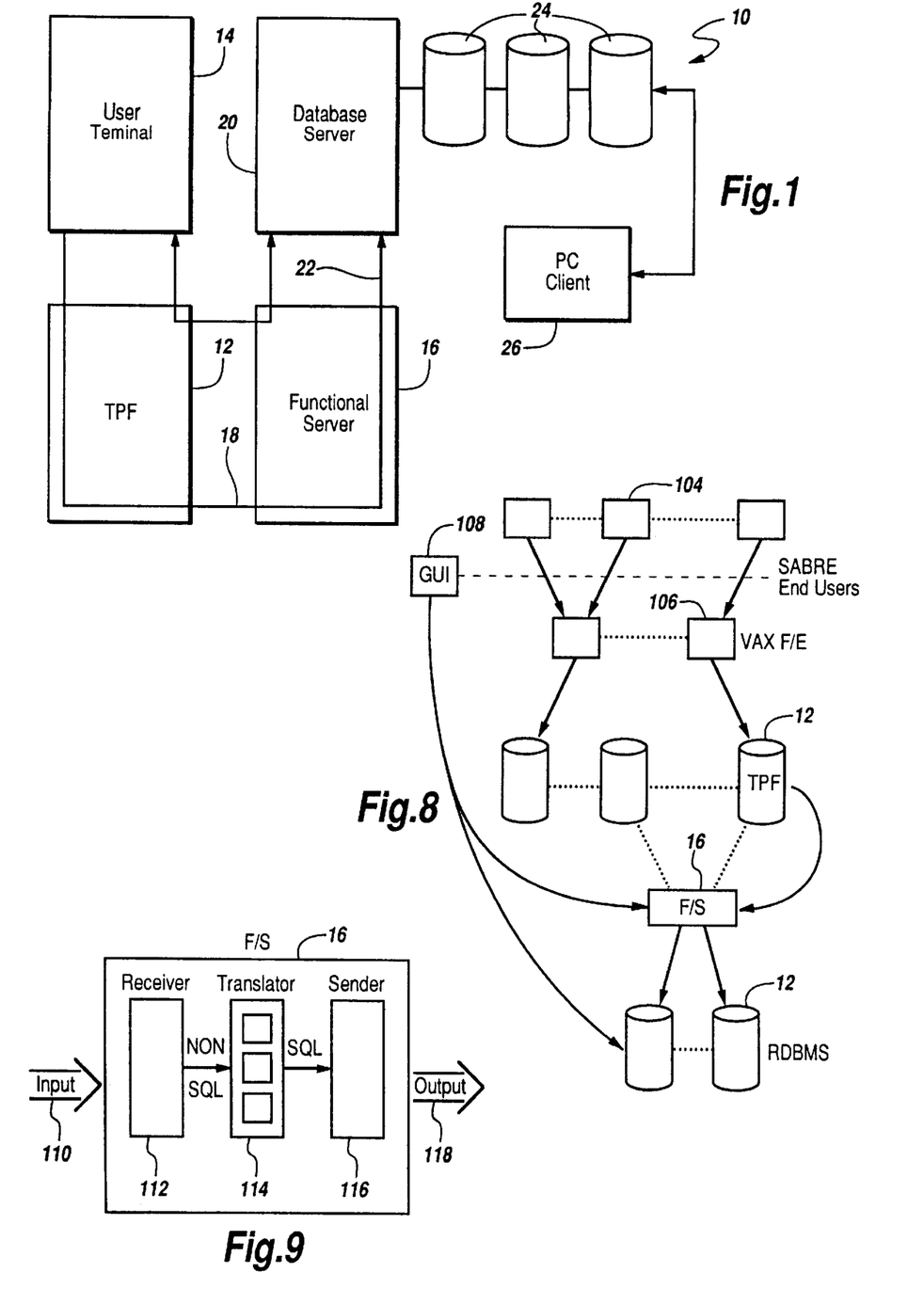
FIG. 1 is a schematic representation of the airline TPF based CRS data propagation system.
FIG. 8 is a schematic representation of communicably linked hardware components illustrating the retrieval and use of the propagated TPF data.
FIG. 9 is a detailed schematic representation of internal processing conducted by the Functional Server as it relates to the retrieval, translation, and use of the TPF propagated data by an end-user.

The system for propagating airline TPF based CRS data and, in particular, American Airlines SABRE TPF based CRS data to a relational database platform and enabling the execution of relational database applications using the TPF data is generally designated as 10 is shown in FIG. 1. The airline computerized reservation system transaction processing facility 12, ("TPF based CRS") of the present invention is a series of mainframe computers such as an IBM ES 3090 coupled together in a centralized processing complex to form the heart of American Airlines' SABRE CRS. A user terminal 14 is communicably connected to the TPF based CRS 12. The user terminal 14 thus serves to interface with applications executing under TPF based CRS control and may be configured as either a dedicated terminal or a personal computer.

A functional server 16 is communicably linked to the CRS TPF 12. The functional server 16, is a software concept and as such, may be one or more computers. Propagated data 18 from the TPF based CRS 12 is propagated in real-time to the functional server 16. A database server 20 receives Structure Query Language ("SQL") statements 22 generated by the functional server 16. The database server 20, like the functional server, is a software concept and may be supported and resident upon one or more computers. The database server 20 may operate in any open relational database environment, for example, DB2, Oracle, Ingres, Informix or Sybase. The database server 20 interprets the SQL statements 22 and performs the desired SQL functions against a relational database 24. The relational database 24 may be one or more digitized storage devices attached to one or more computers in a relational database processing environment. The operating system for the database server 20 may be Unix or an equivalent system. The database server 20 may execute upon, for example, SMP (symmetric multiprocessors) such as IBM's RISC System/600 Models J30 or R30, or a MPP (massively parallel processors), such as IBM's SP2. The functional server 16 hosts relational database input translation applications which act upon propagated data 18 from the TPF based CRS 12. A personal computer ("PC") client 26 uses the data from the relational database and database server 20 to transparently execute non-TPF based CRS applications using the propagated data 18 from the TPF based CRS 12.

Figure 2:
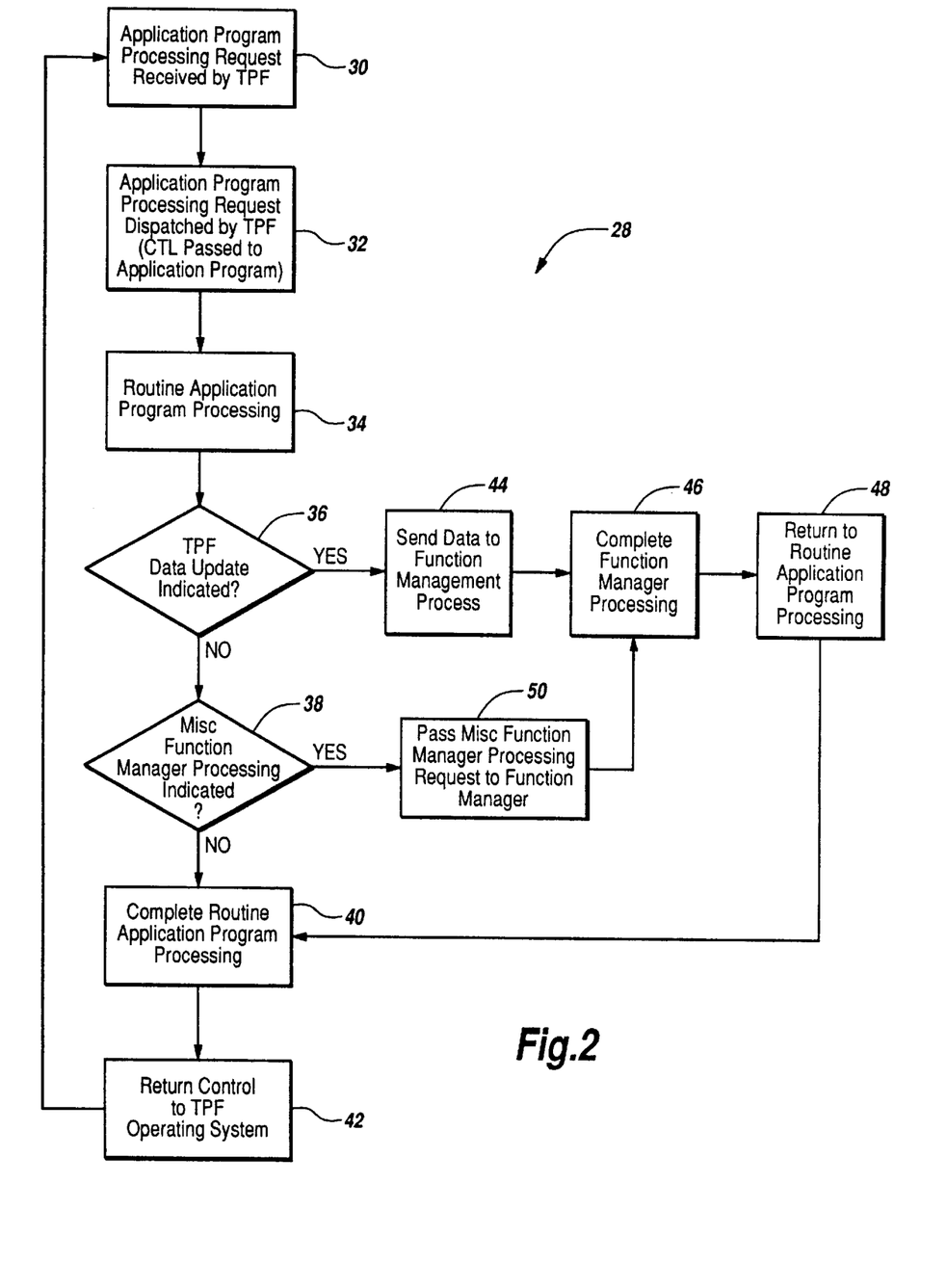
FIG. 2 is a logic flow chart of the airline TPF based CRS data propagation selection process.

A logic flow chart of the data propagation selection process 28 resident on the TPF based CRS 12 is shown in FIG. 2. The process comprises a series of steps for data propagation that occur immediately after the TPF based CRS 12 updates the data or at definable intervals of time, in which case data updates are saved in a log until the next propagation event.

In Step 30, an application program processing request from an end-user or PC client is received by the TPF based CRS 12. The application program processing request is dispatched by the TPF based CRS 12 in step 32 which passes control to the application program. The application program performs routine processing in step 34. In step 36, the system determines whether a TPF based CRS 12 data update is indicated. If no TPF based CRS 12 data update is indicated in step 36, the system determines whether a miscellaneous function management processing is indicated in step 38. If no miscellaneous function management processing is indicated, the routine application program processing is completed in step 40. Control is returned to the TPF based CRS 12 operating system in step 42. If a TPF based CRS 12 data update is indicated in step 36, data is sent to a function management process in step 44. In step 46 function management processing is completed. Step 48 returns to routine application program processing. Routine application program processing is completed in step 40. Control is returned to the TPF based CRS 12 operating system in step 42. If miscellaneous function management processing is indicated in step 38, a miscellaneous function management processing request passes data to the function management process in step 50. In step 46 function management processing is completed. Step 48 returns to routine application program processing. Routine application program processing is completed in step 40. Control is returned to the TPF based CRS 12 operating system in step 42.

Figure 3:
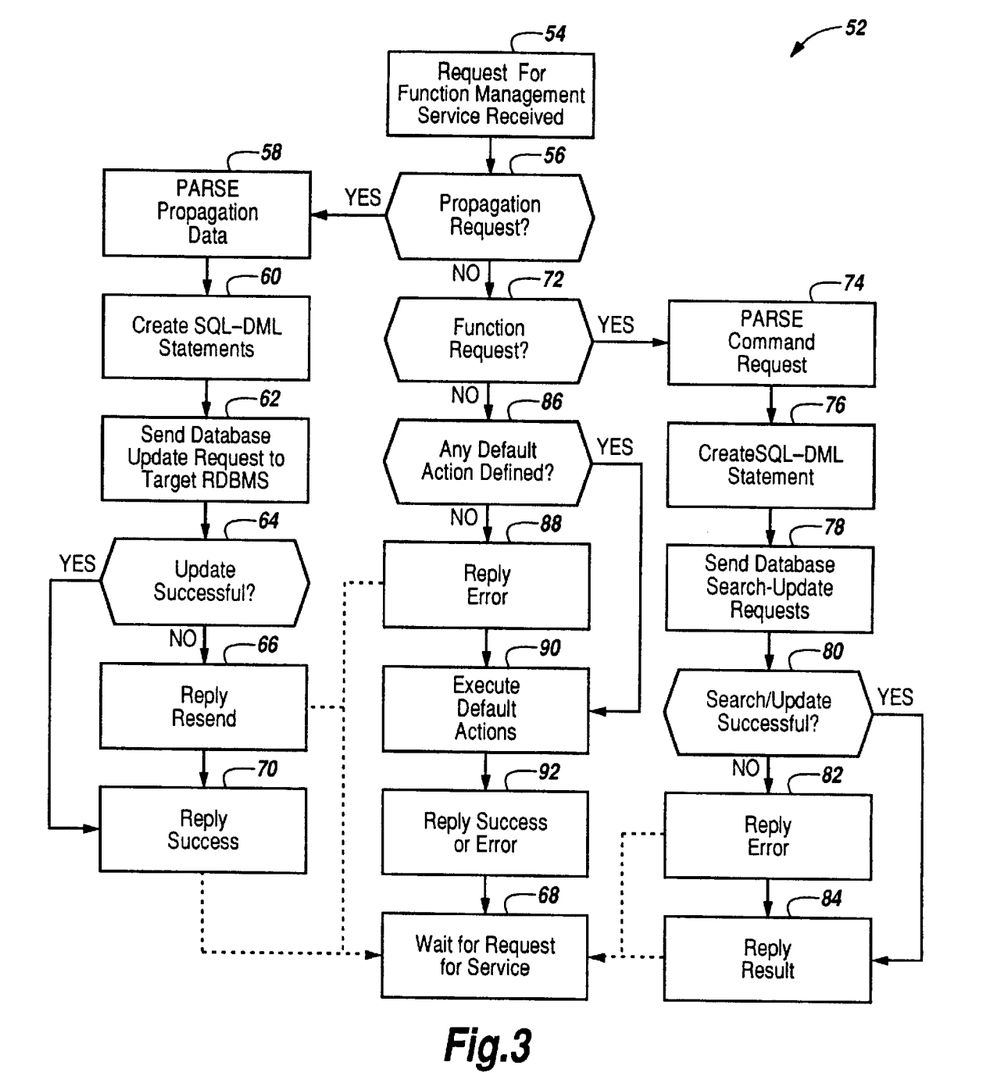
FIG. 3 is a logic flow chart of the function management process.

A logic flow chart of the function management process 52 is shown in FIG. 3. A request for function management service is received in step 54. A determination of whether the request for function management service is a propagation request is made in step 56. If there is a propagation request, the propagation data is parsed in step 58. SQL statements are created in step 60. The parsed propagation data and the SQL statements are sent to update the target relational database management system in step 62. Step 64 determines whether the update of the target relational database management system was successful. If the update of the target relational database management system was not successful a reply message of resend is sent in step 66. The function management process 52 then waits for a new request for service in step 68. If the update of the target relational database management system was successful a reply message of success is sent in step 70. The function management process 52 then waits for a new request for service in step 68.

If there is not a propagation request in step 56, a determination of whether the request for function management service is a function request is made in step 72. If there is a function request, the function command and data are parsed in step 74. SQL statements are created in step 76. The SQL statements containing relevant parsed function data are sent to search/update the target relational database management system in step 78. Step 80 determines whether the search/update of the target relational database management system was successful. If the search/update of the target relational database management system was not successful a reply message of error is sent in step 82. The function management process 52 then waits for a new request for service in step 68. If the search/update of the target relational database management system was successful in step 80, a reply message of the results is sent in step 84. The function management process 52 then waits for a new request for service in step 68.

If there is not a function request in step 72, a determination of whether a default action has been defined is made in step 86. If there is no default action defined, a reply message of error is sent in step 88. The function management process 52 then waits for a new request for service in step 68. If there is a default action defined in step 86, the default action is performed in step 90. A reply message of success or error is sent in step 92. The function management process 52 then waits for a new request for service in step 68.

Figure 4:
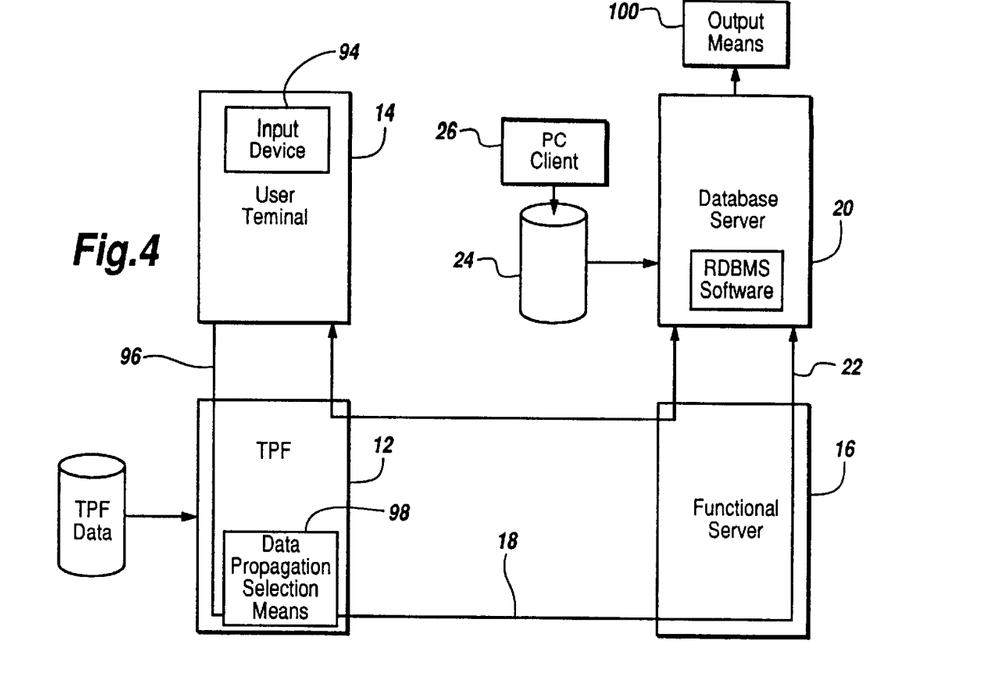
FIG. 4 is a schematic representation of communicably linked remote hardware components attendant to the airline TPF based CRS propagation system.

A schematic representation of communicably linked remote hardware components and propagation software attendant to the TPF based CRS propagation system of FIG. 1 is presented in FIG. 4. The TPF based CRS 12 is communicably linked to an input device 94 of the user terminal 14. The input device 94 may be a keyboard, a mouse, a touch screen or other suitable input means, including resident software modules such as TPF based CRS elapsed interval initiated activity. The input device 94 of the user terminal 14 is used to create an input data structure 96 which is sent to the TPF based CRS system 12. A data propagation selection means 98 as described in reference to FIG. 2 is resident within the TPF based CRS 12. The data propagation selection means 98 is in communication with the functional server 16 and the database server 20. The database server 20 has RDBMS operating function management means 102 residing within both the functional server 16 and the database server 20. The function management means 102 receives requests and creates SQL statements as described in reference to FIG. 3.

Turning now to FIG. 8, there is representative schematic of how the TPF based CRS data 12 is retrieved and used from the relational database 24. Note that SABRE end-users 104 may access the relational database 24 either through a VAX front-end 106 or through the functional server 16 and then subsequently communicate with the relational database 24. Alternatively, the end-user 104 may communicate first through the VAX front-end 106, second through the TPF 12 and then subsequently to the functional server 16. Note also that other non-SABRE users 108 may either access the functional server 16 and then communicate with the relational database 24 or directly with the relational database system. Access to the functional server by SABRE and non-SABRE users may also be performed by voice recognition software that activates the RDBMS software 24 merely by use of voice commands.

One of the primary advantages of the present invention is the ability of the SABRE end-user 104 to access the TPF based CRS data 12 after propagation to a relational database management system 24 using already known language structure software loaded for operation of the database server 20. The database server 20 has an data output means 100 in communication therewith. The data output means may be a computer monitor, a printer, a fax machine or other suitable device. In addition, PC clients 26 and data storage means 24 are communicably linked to the database server 20.

Figure 5:
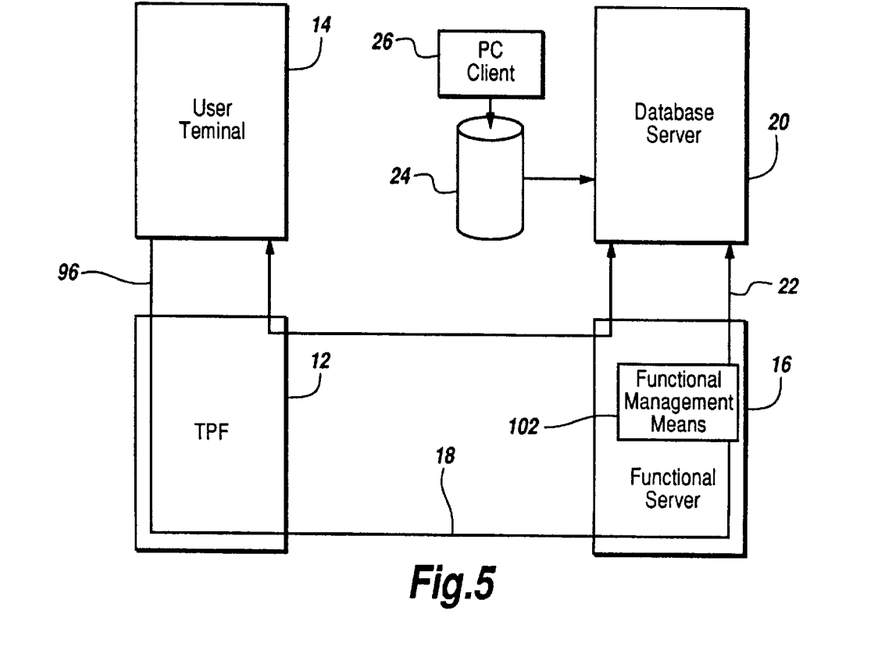
FIG. 5 is a schematic representation of communicably linked hardware components attendant to the airline TPF based CRS propagation system with the function management means residing exclusively within the functional server computer.

A schematic representation of communicably linked remote hardware components and function management software attendant to the TPF based CRS propagation system of FIG. 1 is presented in FIG. 5. The propagated data 18 from the TPF based CRS 12 is received by a function management means 102 residing exclusively within the functional server 16. The function management means 102 receives requests and creates SQL statements which are sent to the database server 20 as described in reference to FIG. 3.

Figure 6:
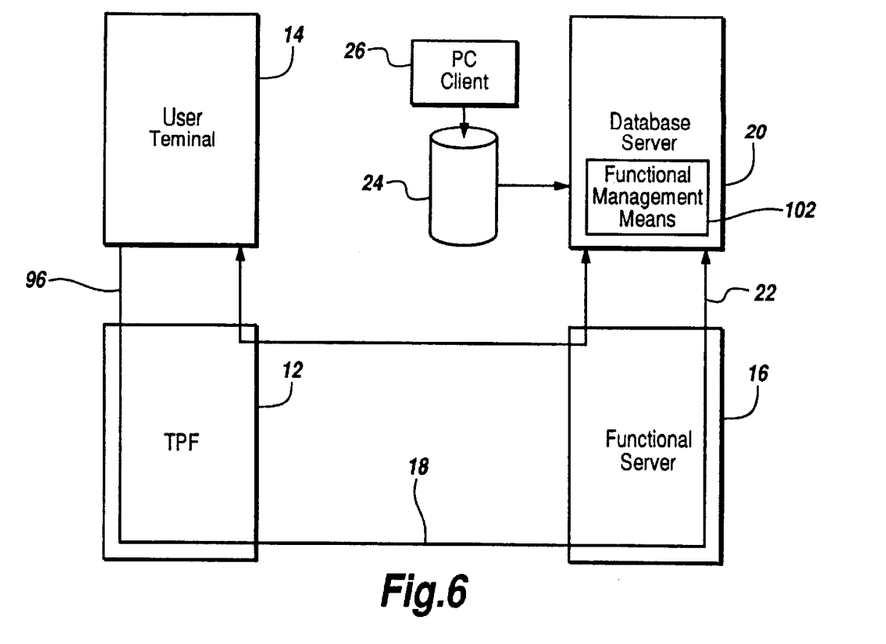
FIG. 6 is a schematic representation of communicably linked hardware components attendant to the airline TPF based CRS propagation system with the function management means residing exclusively within the target relational database management system computer.

In an alternate embodiment, as shown in FIG. 6, the propagated data 18 from the TPF based CRS 12 is received by a function management means 102 residing exclusively within the database server 20. The function management means 102 receives requests and creates SQL statements as described in reference to FIG. 3.

Figure 7:
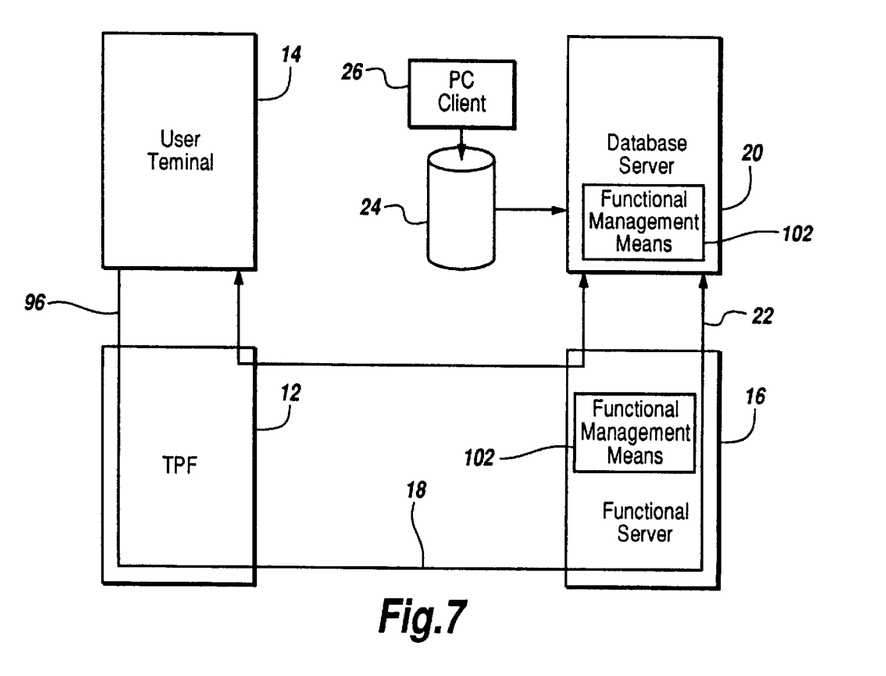
FIG. 7 is a schematic representation of communicably linked hardware components attendant to the airline TPF based CRS propagation with the function management means residing in both the functional server computer and target relational database management system computer.

In an alternate embodiment, as shown in FIG. 7, the propagated data 18 from the TPF based CRS 12 is received by a commands and without the need to upgrade, buy or purchase any additional hardware or software. The SABRE end-user 104, thus, has the ability to utilize the previously TPF based CRS data 12 now existing on the relational database 24, as though the data was still residing on the mainframes. This feature provides the end-users 104 and 108 with the flexibility and adaptability to retrieve and use propagated TPF based CRS data now residing on relational database 24, as if remained resident on the TPF Host CRS (12) at all times. Turning to FIG. 9 therein is disclosed in more detail the ability of the end-users 104 and 108 to input commands 110 which may be SABRE commands, English commands, SQL language or any other type of input queries. The input commands 110 are received by the receiver 112 of the functional server 16. The receiver 112 passes the commands that are in non-SQL language through the translator 114 which converts it into the structured query language (SQL) and then through the sender 116 that produces an output 118 which is compatible with the relational database server 20. The output 118 is then used by the relational database 24 in the execution of any relational database server applications.

By way of example, the present invention for a system for propagating TPF based CRS data to a relational database platform and enabling the execution of relational database applications using the TPF based CRS data is now described in reference to the propagation, function management and use by an end-user of an American Airlines' SABRE CRS Passenger Name Record ("PNR").

The original PNR is stored on the TPF based CRS 12. The PNR, as TPF based CRS data, is a mix of textual and parametric data, stored as a text object. When the PNR is entered into the TPF based CRS it is propagated to a functional server and subsequently stored in a relational database. The information is stored in four logical entities or tables in the relational database which are: Reservation, Segment, Passenger, and Ticket.

Table Reservation contains the actual PNRs. The PNRs are stored as Table Reservation Attribute PNRs, as specified in Table 1 below. Attribute PNR Status specifies whether the PNR is in error, and if so, what type of error it is (N for no-error, C for data corrupted error, T for data corrupted error with PNR truncated, E for other types of error). Attribute PNR Locator, Purge Date, and PCC contain parameters specified in the PNR itself. PNR Locator is the unique PNR code used by travel agents and customers to quickly locate the PNR. Attribute Purge Date is the date the PNR was scheduled to be purged from the CRS system. PCC stands for Pseudo-City-Code, the location code of the agency which booked the reservation. Archive Date specifies the date the PNR was archived, i.e., stored in this table. PNR Number is the unique identifier for the PNR when stored in the archive.

TABLE 1

| Table Reservation | | |
|---|---|---|
| Attribute | Data Type | Description |
| PNR Number | Number | Archive-Unique PNR Number |

Table Segment contains flight segments stored in the original PNR on the special segment lines, as specified in Table 2 below. Each flight segment consists of Airline Code and Flight Number, DCC (Departure City Code) and ACC (Arrival City Code), and Departure Date. Flight segments can be canceled or still active. Attribute Segment Status represents whether the flight segment is still active. Attribute Segment Status represents whether the flight segment is still active (OK) or canceled. If canceled, it shows the reason for cancellation, such as AS, SC, or XS. The PNR Number specifies which PNR a particular flight segment (a row of the Segment table) is associated with. There can be several flight segments per PNR. Attribute Segment Number specifies the segment number within the PNR. The combination of PNR Number and Segment Number attributes is unique.

TABLE 2

Table Segment

| Attribute | Data Type | Description |
| --- | --- | --- |
| PNR Number | Number | Archive-Unique PNR Number |

Table Passenger contains passengers for which reservations are booked, as specified in Table 3 below. This information is stored on special lines within the original PNRs. Each line contains the common last name of one or more passengers, or the name of the organization for which the reservation is made. This name is stored in attribute Name. Attribute Passenger Type indicates whether the passenger is a person or persons (P) or an organization (B, C, or I). Attribute Passenger Count specifies how many actual individuals are represented by this PNR line (by this Passenger table row). The PNR Number specifies which PNR a particular passenger (a row of the Passenger table) is associated with. There can be several passengers per PNR. Attribute Passenger Number specifies the passenger number within the PNR. The combination of PNR Number and Passenger Number attributes is unique.

TABLE 3

Table Passenger

| Attribute | Data Type | Description |
| --- | --- | --- |
| PNR Number | Number | Archive-Unique PNR Number |

Table Ticket contains tickets booked for all reservations, as specified in Table 4 below. This information is stored on special lines within the original PNRs. Each line contains the ticket number and ticket type. Attribute Ticket Number is an array of digits. The first three digits represent airline code, and the rest represent the unique ticket number within the airline. The entire ticket number, however, is treated here as one single array of digits. Ticket Number is unique. Attribute Ticket Type can have several values, as specified in the original PNR, such as AT, CY, EG, TC, TCN, TK, T-TK. The PNR Number specifies which PNR a particular ticket (a row of the Ticket table) is associated with. There can be several tickets per PNR.

TABLE 4

Table Ticket

| Attribute | Data Type | Description |
| --- | --- | --- |
| PNR Number | Number | Archive-Unique PNR Number |

Each of the tables Segment, Passenger, and Ticket, is related to the Reservation table, because rows in those three tables correspond to specific reservations in the Reservation table. For example, one reservation contains zero or more flight segments while one flight segment can be associated with only one reservation. This Reservation-to-Segment relationship is of type one-to-many. One reservation contains one or more passengers (in the sense described above) but one passenger can be associated with only one reservation. This Reservation-to-Passenger relationship is of type one-to-many. One reservation contains zero or more tickets while one ticket can be associated with only one reservation. This Reservation-to-Ticket relationship is also of type one-to-many.

The parsed PNRs as described above are sent from the functional server computer to the database server with appended SQL statements. The SQL define the logical database schema, i.e. the four tables. Below, the SQL statements are represented by the terms Character, Date, Number, and String, where String represents an array of characters and stores text.

The last one or two lines of every definition specifies the primary key and possibly a foreign key for each table. For table Reservation, the primary key is attribute PNR Number. For table Segment, the primary key is the combination of attributes PNR Number and Segment Number. For table Passenger, the primary key is the combination of attributes PNR Number and Passenger Number. For table Ticket, the primary key is attribute Ticket Number.

Tables Segment, Passenger, and Table each contain one foreign key (the last line of the definitions of those tables). The foreign key for each of the three tables is PNR Number. This is defined by specifying what table the foreign key references (each references table Reservation). Tables Segment, Passenger, and Table each contain one foreign key (the last line of the definitions of those tables). The foreign key for each of the three tables is PNR Number. This is defined by specifying what table the foreign key references (each references table Reservation).

Note that all attributes in all four tables can never have nulls, i.e., there always has to be a value for each attribute in each row of every table.

```
Create Table Archive.Reservation (
    PNRNumber Number Not Null,
    PNRLocator String Not Null,
    PurgeDate Date Not Null,
    ArchiveDate Date Not Null,
    PCC Char String Not Null,
    PNP String Not Null,
    Primary Key ( PNRNumber ) )
Create Table Archive.Segment (
    PNRNumber Number Not Null,
    SegmentNumber Number Not Null,
    AirlineCode String Not Null,
    DCC String Not Null,
    ACC String Not Null,
    DepartureDate Date Not Null,
    SegmentStatus String Not Null,
    FlightNumber Number Not Null,
    Primary Key ( PNRNumber, SegmentNumber )
    Foreign Key ( PNRNumber ) References Reservation )
Create Table Archive.Passenger (
    PNRNumber Number Not Null References Reservation,
    PassengerNumber Number Not Null,
    PassengerCount Number Not Null,
    PassengerType Character Not Null,
    Name String Not Null,
    Primary Key ( PNRNumber, PassengerNumber )
    Foreign Key ( PNRNumber ) References Reservation )
```

```
Create Table Archive Ticket (
    PNRNumber Number Not Null References Reservation,
    TicketNumber String Not Null,
    TicketType String Not Null,
    Primary Key ( TicketNumber )
    Foreign Key ( PNRNumber ) References Reservation )
```

The following is the SQL syntax to express end user functions against the database. For example, the end use may search for PNRs knowing the PNR Locator Number. The SQL statement below finds reservations with specified reservation locator number. The term prefixed by a colon specifies an input variable, so PNR locator is used as input value. Note that PNR status is also returned so that we know whether the reservation is in error or not. The name of the first passenger is returned as well so that the end user can have more information when deciding what PNR to actually retrieve.

```
Select PNRNumber, PNRStatus, Name
From Reservation R, Passenger P
Where R.PNRNumber = P.PNRNumber And
    PNRLocator = :PNRLocator And
    PassengerNumber = 1
```

Similarly the end user may search for PNRs knowing the Ticket Number. The SQL statement below finds reservations containing specified ticket number. The statement joins tables Reservation, Ticket, and Passenger by equating the PNR Number attribute in all three tables. Ticket number is used as input value.

```
Select R.PNRNumber, PNRStatus, Name
From Reservation R, Ticket T, Passenger P
Where R.PNRNumber = T.PNRNumber And
    R.PNRNumber = P.PNRNumber And
    TicketNumber = :TicketNumber And
    PassengerNumber = 1
```

The end user may also search for PNRs knowing the Airline, Flight, Name, and Dates. The SQL statement below finds reservations given passenger name, airline, departure and arrival city codes, and departure date(s). The statement joins tables Reservation, Segment, and Passenger by equating the PNR Number attribute in all three tables. Airline code, flight number, name, begin date, and end date are used as in put values. Note that the name input value is pattern matched (by using the keyword Like) and not exactly equated. This is done so that even just partial names could be supplied to the search statement. Both Name and Departure Date attributes are also returned, to give the end user more information when making decision which PNR to actually retrieve.

```
Select R.PNRNumber, PNRStatus, Name, DepartureDate
From Reservation R., Segment S, Passenger P
Where R.PNRNumber = P. PNRNumber And
    S.PNRNumber = P.PNRNumber And
    AirlineCode = :AirlineCode And
    FlightNumber = :FlightNumber And
    Name Like :Name And
    DepartureDate Between ( :BeginDate, :EndDate )
```

In addition, the end user may search for PNRs knowing the airline, airports, name, and dates. The SQL statement below finds reservations given passenger name, airline and flight number, and departure date(s). The statement joins tables Reservation, Segment, and Passenger by equating the PNR Number attribute in all three tables. Airline code, departure city code, arrival city code, name, begin date, and end date are used as input values.

```
Select R.PNRNumber, PNRStatus, Name, DepartureDate
From Reservation R, Segment S, Passenger P
Where R.PNRNumber = P.PNRNumber And
    S.PNRNumber = P.PNRNumber And
    AirlineCode = :AirlineCode And
    DCC = :DCC And
    ACC = :ACC And
    Name Like :Name And
    DepartureDate Between ( :BeginDate, :EndDate )
```

Similarly, the end user may retrieve PNRs using the PNR number. The statement below displays reservation selected from a list of reservations. PNR number is used as input value.

```
Select PNR
From Reservation
Where PNRNumber = :PNRNumber
```

The following is the SQL syntax to express administrative functions against the database; for example, inserting today's PNRs. The set of SQL statements below inserts today's reservations into the database. After the Reservation row is inserted, all Segment rows, Passenger rows, and Ticket rows are inserted which are related to that reservation. This set of statements is executed for each reservation purged today from the American Airlines SABRE CRS.

```
Insert Into Reservation
    Values ( :PNRNumber, :PNRLocator, :PurgeDate,
        :Today, :PCC, :PNRStatus, :PNR )
While ( more segments )
    Insert Into Segment
        Values ( :PNRNumber, :SegmentNumber,
            :AirlineCode, :DCC, :ACC, :DepartureDate,
            :SegmentStatus, :FlightNumber )
While ( more passengers )
    Insert Into Passenger
        Values ( :PNRNumber, :PassengerNumber,
            :PassengerCount, :PassengerType, :Name )
While ( more tickets )
    Insert Into Ticket
        Values ( :PNRNumber, :TicketNumber,
            :TicketType )
```

Similarly, the administrative function of purging PNRs from the system is accomplished by the set of SQL statements below. First Ticket rows, Passenger rows, and Ticket rows related to a specific reservation are deleted, and then the reservation itself is deleted. This is done for all outdated reservations.

```
Delete Ticket
Where PNRNumber In
    ( Select PNRNumber
      From Reservation
      Where PurgeDate > :DeleteDate )
Delete Passenger
Where PNRNumber In
    ( Select PNRNumber
      From Reservation
      Where PurgeDate > :DeleteDate )
Delete Segment
Where PNRNumber In
    ( Select PNRNumber
      From Reservation
      Where PurgeDate > :DeleteDate )
Delete Reservation
Where PurgeDate > :DeleteDate
```

Although the invention has been described in detail, it is to be clearly understood that the same is by way of illustration and example only and is not to be taken by way of limitation, the spirit and scope of the invention being limited only to the terms of the appended claims.

What is claimed is:

1. A method for processing airline reservations comprising the steps of:
    inputting airline reservation records to a transaction processing server computer;
    appending at least one selected database query statement to each airline reservation record received from said transaction processing server computer;
    storing airline reservation records with the selected database query statement in a storage subsystem; and
    permitting use by a client terminal of airline reservation records stored in said storage subsystem.

2. A method according to claim 1, wherein a functional server computer receives each airline reservation record and the step of permitting use includes the substep of accessing airline reservation records stored in said storage subsystem independently of said transaction processing server computer and the functional server computer.

3. A method according to claim 1, wherein said appending step includes parsing asynchronously transferred data, including the airline reservation records, from said transaction processing server computer.

4. A method according to claim 1, wherein a functional server computer receives each airline reservation record and the step of permitting use includes the substep of using airline reservation records stored in said storage subsystem independently of said transaction processing server computer and the functional server computer.

5. An airline reservation system comprising:
    a memory having program instructions; and
    a processor configured to use the program instructions to receive airline reservation records from a transaction processing server computer; to append at least one selected database query statement to each airline reservation record received from said transaction processing server computer; and to allow use of airline reservation records with the selected database query statement by a client terminal.

6. An airline reservation system according to claim 5, wherein the airline reservation system is configured to permit the client terminal to access airline reservation records with a selected database query statement independently of said transaction processing server computer and the processor.

7. An airline reservation system according to claim 5, wherein the instruction to receive airline reservation records parses asynchronously transferred data, including the airline reservation records, from said transaction processing server computer.

8. An airline reservation system according to claim 5, wherein the airline reservation system is configured to permit the client terminal to use airline reservation records independently of said transaction processing server computer and the processor.

9. An airline reservation system comprising:
    a transaction processing server computer for receiving airline reservation records;
    at least one transaction terminal, coupled to said transaction processing server computer, providing an interface for inputting airline reservation records to said transaction processing server computer and for receiving airline reservation records from said transaction processing server computer in response to requests from said transaction terminal;
    a functional server computer, coupled to said transaction processing server computer, for receiving airline reservation records propagated from said transaction processing server computer and for appending at least one selected database query statement to each airline reservation record received from said transaction processing server computer;
    a database server computer, coupled to said functional server computer, for receiving airline reservation records with the selected database query statement from said functional server computer and for storing airline reservation records with the selected database query statement in a storage subsystem; and
    at least one client terminal, communicably linked to said storage subsystem, for using airline reservation records stored in said storage subsystem.

10. An airline reservation system according to claim 9, wherein said client terminal includes means for accessing said storage subsystem independently of said transaction processing server computer and said functional server computer.

11. An airline reservation system according to claim 9, wherein said client terminal includes means for using selected database queries to access airline reservation records stored in said storage subsystem.

12. An airline reservation system according to claim 9, wherein said database server computer includes a module for transmitting airline reservation records from said storage subsystem to said client terminal in response to selected database queries from said client terminal.

13. An airline reservation system according to claim 9, wherein said transaction processing server computer asynchronously transfers data including said airline reservation records to said functional server computer and said functional server computer parses the transferred data to extract the airline reservation record.

14. An airline reservation system according to claim 9, wherein said client terminal includes means for using information transferred from said storage subsystem independently of said transaction processing server computer and said functional server computer.

* * * * *